United States Patent [19]

Lutze et al.

[11] 4,098,990

[45] Jul. 4, 1978

[54] PROCESS FOR THE PURIFICATION OF LOW PRESSURE POLYMERIZED POLYOLEFIN POWDER USING RECYCLED, ANION-EXCHANGE TREATED WATER

[75] Inventors: Siegfried Lutze, Gelsenkirchen; Hans Feichtinger, Dinslaken; Hans-Walter Birnkraut, Oberhausen, all of Germany

[73] Assignee: Ruhrchemie Aktiengesellschaft, Oberhausen, Germany

[21] Appl. No.: 705,048

[22] Filed: Jul. 14, 1976

Related U.S. Application Data

[63] Continuation of Ser. No. 538,103, Jan. 2, 1975, abandoned.

[30] Foreign Application Priority Data

Jan. 10, 1974 [DE] Fed. Rep. of Germany ....... 2400977

[51] Int. Cl.$^2$ ................................................ C08F 6/00

[52] U.S. Cl. .................................... 528/490; 528/482; 528/486; 528/496; 528/499

[58] Field of Search ............... 528/482, 499, 486, 496, 528/490; 260/2.1 E; 210/24 R

[56] References Cited

U.S. PATENT DOCUMENTS

| | | | |
|---|---|---|---|
| 2,929,808 | 3/1960 | Ross et al. ........................... | 260/94.9 |
| 3,074,921 | 1/1963 | Carter ................................. | 260/94.9 |
| 3,119,797 | 1/1964 | McGaughy et al. ............... | 260/93.7 |
| 3,296,238 | 1/1967 | Van Der Plas ..................... | 260/93.7 |
| 3,342,794 | 9/1967 | Buchanan .......................... | 260/93.7 |
| 3,562,227 | 2/1971 | DiDrusco et al. ................. | 260/80.78 |

*Primary Examiner*—Stanford M. Levin
*Attorney, Agent, or Firm*—Bierman & Bierman

[57] ABSTRACT

A process is described whereby corrosive, halogen-containing compounds are removed from polyolefins. Briefly, the process comprises mixing the polyolefin with water in a purification zone, treating at least part of the water with an ion exchanger and returning the treated water to the purification zone.

8 Claims, No Drawings

PROCESS FOR THE PURIFICATION OF LOW PRESSURE POLYMERIZED POLYOLEFIN POWDER USING RECYCLED, ANION-EXCHANGE TREATED WATER

This application is a continuation of Application Ser. No. 538,103 filed Jan. 2, 1975, now abandoned, which claims priority of German Application No. P 24 00 977.6 filed Jan. 10, 1974.

The invention relates to a fine purification process for polyolefins which have been produced using halogen-containing catalysts, the process resulting in products which are free of halogen compounds normally split off by such polymers at elevated temperatures.

In the known low pressure process for the production of polyolefins according to Ziegler, catalyst systems comprising halogen-containing compounds of elements of Groups IV to VI of the Periodic Table and organometallic compounds of the metals of Groups I to III of the Periodic Table are used.

Attempts have been made to remove catalyst residues from these polyolefins by washing with dilute acids. However, these acids are retained by the polymers by absorption sufficiently tenaciously that they are incapable of being completely removed even by tedious and lengthy washing with water. These acids are liberated at elevated temperatures occurring during drying and processing of the polyolefins so that serious corrosion of drying apparatus and apparatus used in further processing are unavoidable (see DAS 1,161,426).

A number of other processes used to remove halogen-containing, especially chlorine-containing catalyst ingredients from the polymer are known. For example, attempts were made to achieve this by hydrolysis with neutralizing agents (see German Patent Nos. 1,131,408 and 1,201,063). Moreover, catalyst residues have also been removed by adding specific alcohols, emulsifiers or complexing agents (see German Offenlefungsschrift 1,420,236, DAS 1,128,981 and DAS 1,161,426).

It was observed also in these processes which operate with added materials that it is impossible to completely remove corrosive ions from the polymer granule. These ions then separate and are eliminated when drying, granulating, pelletizing and/or further processing the polyolefin to form molded articles. Hence, prevention of corrosion is impossible. Corrosion products which are thus formed remain as impurities in the polyolefin and impair its mechanical properties, cause discoloration and are capable of forming undesirable compounds with conventional additives.

It is an object of this invention to provide a purification process which results in a polymer which can be processed without the disadvantages mentioned above.

It was surprisingly found that it is possible to obtain in a simple manner, polyolefins which do not exhibit the disadvantages mentioned above, by practicing the present invention.

The invention comprises a process for fine purification of polyolefins produced with the use of catalyst systems comprising halogen-containing compounds of the element of Groups IV to VI of the Periodic Table and organometallic compounds of the metals of Groups I to III of the Periodic Table in the presence of organic diluents, the purification being effected by treatment with water, part of which may be used as steam. The process is characterized in that at least part of the water is continuously recirculated through an ion exchanger and returned to the treating zone.

It is desirable that the polyolefin prior to the treatment be separated from the diluent which contains the bulk of the catalyst and, preferably, is freed from further catalyst portions by washing with alcohol and/or water which may contain inorganic or organic acids.

In carrying out the process according to the present invention, it is possible, for example, to contact a suspension of the polyolefin in an organic diluent or the polyolefin alone in a stirred vessel with deionized water in such a manner that a partial stream of the water used is contacted with an ion exchanger and thereafter returned into the washing process.

However, the process is particularly suited for a mode of operation where the bulk of the water is continuously contacted with the polyolefin in counter-current flow relation.

Suitable ion exchangers which may be used include any material formed on an inorganic or organic basis, especially those exchangers which are fully effective at the operating temperatures of polyolefin processing.

Preferably organic ion exchangers based on macromolecular, monofunctional, basic resins are used.

The treatment is desirably carried out at 60° to 110° C. While subatmospheric or superatmospheric pressure may be used, it is desirable to effect the treatment at atmospheric pressure.

The fine purification process in accordance with this invention is applicable, inter alia, to polyolefins which have been produced with the use of very small amounts of catalyst to suppress and avoid from the outset corrosion problems and difficulties connected therewith. At the same time, however, attempts were made to simplify the processing of the products by restricting to a minimum necessary purification measure.

The process according to the invention is carried out with particular advantage during the evaporation of residual hydrocarbon suspending agent from high molecular weight low-pressure polyolefins. The polymer is separated from the diluent, washed with a liquid containing hydrogen chloride, and subsequently washed repeatedly with water. This results in a product which contains residual hydrocarbons (e.g. gasoline) and 80 p.p.m. of HCl in addition to water. This product is treated with water and steam while part of the water having been heated with the polyolefins and which contains residual gasoline which is passed through an anion exchanger and the deionated water is returned to the treating vessel. It is possible in this manner to reduce the content of hydrogen chloride in the water to less than 1 p.p.m. The rate at which the HCl is removed is largely dependent upon the throughput rate of the recycled water. It is possible to accelerate the separation of the halogen to a rate which corresponds to the operational requirements merely by increasing the throughput rate.

A preferred embodiment of the present invention is illustrated by the following example. FIG. 1 shows an experimental apparatus in which comparative experiments were carried out to demonstrate the effect of the treatment.

The process is preferably carried out continuously. An embodiment is illustrated by the flow diagram represented in FIG. 2. A suitable treating vessel 1 is fed, through conduit 11, with polyethylene powder and gasoline. In this vessel the polyethylene powder which is moist with gasoline is freed from gasoline by introducing water vapor. Part of the aqueous phase which is simultaneously present in this process is withdrawn through a filter 2 (screen, porous plate or the like) by means of a pump 3. It is then forced through the ion exchanger I in vessel 4 and returned to treating vessel 1 in countercurrent flow with the polyethylene powder stream. Purified polyethylene powder leaves the treating vessel 1 together with water through line 6. Steam is introduced through lines 7 while vapors (gasoline, water vapor) are withdrawn through line 26.

After having reached the capacity of the ion exchanger I, the ion exchanger II in vessel 5 may be inserted into the cycle while the exchanger I is removed from the stream for regeneration, e.g. by means of sodium hydroxide solution from tank 8 in the case of using anion exchangers. Deionized rinsing water may be passed through conduits 9 and 10, represented by dot-dash lines, to the ion exchangers I and II. The resultant waster water is led off through conduits 12 and 13 represented by broken lines.

EXAMPLE

In a 4 liter three-necked flask 14 (FIG. 1) equipped with a stirrer 15 driven by an electric motor M, an electric heater 16, a reflux condenser 17, a gasoline separator 18, and an immersed frit 19, 800 g. of low pressure polyethylene (molecular weight, about 100,000) which is moist with gasoline are heated to boiling together with 1,000 ml. of distilled water while stirring. The evaporated and subsequently condensed gasoline/water phase is separated in the separator vessel 18. The lower water phase flows back into the flask 14. The gasoline is continuously separated as the upper phase.

At the same time while separating the gasoline, part of the (condensed) water is withdrawn through the immersed frit 19 by means of a pump 20, passed through an exchanger column 21 containing 100 ml. of a weakly basic anion exchanger (trade name "Lewatit MP 60", Bayer), and returned into the flask 14. The exchanger can be heated to the temperature of the vessel 14 by means of a heating jacket 22. By means of the drain valves 23 and 24, water samples may be taken upstream and at a short distance downstream of the exchanger column 21. By means of the control valve 25, the effluent rate of the deionate can be adjusted in such a manner that the exchanger column 21 is always filled with water.

Depending upon the time and flow rate (v/v.hr.) in the exchanger column 21 different HCl contents are found in the water cycle.

To determine the residual chlorine content in the polyethylene, polyethylene samples are taken at certain time intervals from the flask 14. In doing so, it has been observed the the purification effect is improved as the flow rate of the water through the ion exchanger is increased.

The results of experiments are shown in the following Table.

Table 1

Variation of the HCl content in the recycle water in dependence on the flow rate in the exchanger (liters of recycle water/liter of exchanger . hr.) and on the duration of the run:

| Experiment according to Example 1 | a | b |
|---|---|---|
| Flow rate (liters/liter . hr.) | 15 | 40 |
| HCl content (p.p.m.) in the recycle water after a duration of the run of | | |
| 0.5 hours | 50 | 27 |
| 1.0 hour | 47 | 22 |
| 2.0 hours | 7 | 3 |
| 3.0 hours | 2 | 0 |

Table 1-continued

Variation of the HCl content in the recycle water in dependence on the flow rate in the exchanger (liters of recycle water/liter of exchanger . hr.) and on the duration of the run:

| Experiment according to Example 1 | a | b |
|---|---|---|
| 4.0 hours | 0 | 0 |

A polyethylene powder sample taken in run $a$ after 3 hours was freed from the bulk of water adhering thereto by suction filtration on a suction filter. The residual water content then was still 20% by weight. Thereafter the sample was dried at 100° C. and 500 Torr in a nitrogen stream and the water vapor formed was condensed. The condensate contained < 1 p.p.m. HCl, based on the amount of dry polyethylene powder.

A polyethylene powder sample taken in run $b$ after 2 hours was treated in the same manner. The resultant condensate also contained < 1 p.p.m. HCl, based on dry polymer.

In a comparative experiment, 800 g. of low pressure polyethylene which was moist with gasoline were treated in the same apparatus with the same total amount of water as in runs $a$ and $b$ except that a partial stream of the water used for steaming the gasoline was not continuously passed through the ion exchanger. The sample was instead heated for 1 hour together with 500 ml. of water thereby driving off the bulk of the gasoline. After having drained and discarded the water, it was replaced by 500 ml. of fresh distilled water and thereafter the sample was treated as above for another hour. Thereafter the HCl content in the aqueous phase was 25 p.p.m. The sample after suction filtration and drying as in Examples $a$ and $b$ gave a condensate which contained 17 p.p.m. of HCl based on the amount of polyethylene powder.

The comparative experiment illustrates that considerable corrosion may occur from the residual amounts of HCl during the course of time in the drying units arranged downstream of the treating apparatus during the drying process.

This is avoided by the experimental set-up and procedure in accordance with tests $a$ and $b$ and as represented in FIG. 1 because substantially no corrosive constituents are evolved during the drying process of the polymer powder having been pretreated in this manner.

The anion exchanger used in the example with the trade name "Lewatit MP 60" is a spherical (0,1 – 1,5 mm diameter), macroporous, monofunctional, slightly basic anion exchanger on the base of polystyrene with a bulk weight of 600 – 700 gram/liter.

What is claimed is:
1. In a process for removing halogen-containing compounds from polyolefin powder produced using a catalyst containing halogen-containing compounds and an organic diluent, the improvement comprising the steps of separating the diluent from the polyolefin powder, placing the separated powder in a purification zone, contacting the separated powder with water, removing a portion of said water from said purification zone, contacting the removed water with an anion exchange resin to deionize the removed water, and returning the deionized water to said purification zone to again contact said polyolefin powder, repeating the steps of removing a portion of the water, contacting the removed water with said resin and returning said water to the purification zone while continuously separating the diluent from the powder, until the removed water con- tains a selected low amount of halogen-containing compounds and thus the powder will contain a selected low amount of halogen-containing compounds.

2. The process of claim 1 in which the contacting is conducted at a temperature of 60° to 110° C.

3. The process according to claim 1 further comprising the steps of washing the polyolefin with hydrogen chloride and then washing the polyolefin with water prior to placing the polyolefin in the purification zone.

4. The process of claim 1 in which the polyolefin powder is produced with the use of a catalyst comprising a halogen-containing compound of an element of Groups IV to VI of the Periodic Table and an organometallic compound of a metal of Groups I to III of the Periodic Table, in an organic diluent, and the polyolefin is substantially freed of residual catalyst and organic diluent prior to contacting the polymer with water in the purification zone.

5. The process of claim 1 which further comprises washing the polyolefin powder with a lower alkanol or water containing an inorganic or organic acid, prior to contacting the powder with water in the purification zone.

6. The process of claim 5 in which the contacting is conducted at a temperature of 60° to 110° C.

7. The process of claim 6 in which the contacting is conducted at substantially atmospheric pressure.

8. The process according to claim 6 further comprising the step of washing said polyolefin in said purification zone countercurrently.

* * * * *